(12) United States Patent
Lee

(10) Patent No.: US 7,808,560 B2
(45) Date of Patent: Oct. 5, 2010

(54) VIDEO PROCESSING APPARATUS AND DATA PROCESSING METHOD

(75) Inventor: Woo-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1319 days.

(21) Appl. No.: 11/315,352

(22) Filed: Dec. 23, 2005

(65) Prior Publication Data

US 2006/0277587 A1 Dec. 7, 2006

(30) Foreign Application Priority Data

Jun. 3, 2005 (KR) .................. 10-2005-0047913

(51) Int. Cl.
*H04N 9/64* (2006.01)
(52) U.S. Cl. .............. 348/714; 348/465; 348/569; 348/730
(58) Field of Classification Search ......... 348/730–731, 348/725, 569, 460, 461, 733, 571, 714, 718–721, 348/465; 725/37, 39, 45, 46, 131, 132, 140, 725/151–152; *H04N 9/64*
See application file for complete search history.

(56) References Cited

U.S. PATENT DOCUMENTS

| | | | | |
|---|---|---|---|---|
| 6,031,580 | A * | 2/2000 | Sim ............................ | 725/43 |
| 6,212,680 | B1 * | 4/2001 | Tsinberg et al. ............... | 725/39 |
| 6,337,719 | B1 * | 1/2002 | Cuccia ....................... | 348/731 |
| 6,452,644 | B1 * | 9/2002 | Shimakawa et al. ......... | 348/730 |
| 7,109,974 | B2 * | 9/2006 | Kempisty ................... | 345/173 |
| 2004/0252238 | A1 | 12/2004 | Park et al. | |
| 2005/0072293 | A1 | 4/2005 | Lee | |
| 2006/0165378 | A1 | 7/2006 | Noda et al. | |

FOREIGN PATENT DOCUMENTS

| | | |
|---|---|---|
| CN | 1533174 A | 9/2004 |
| CN | 1604630 A | 4/2005 |
| CN | 1770842 A | 5/2006 |
| EP | 0 554 577 A1 | 8/1993 |
| EP | 0 650 294 A2 | 4/1995 |
| KR | 10-0227740 B1 | 8/1999 |
| KR | 1999-0076147 A | 10/1999 |
| WO | 2004/068488 A1 | 8/2004 |
| WO | WO 2005/020077 A1 | 3/2005 |

\* cited by examiner

*Primary Examiner*—Trang U Tran
(74) *Attorney, Agent, or Firm*—Sughrue Mion, PLLC

(57) ABSTRACT

A video processing apparatus includes a memory to store auxiliary video data therein; a data updating unit to transmit the auxiliary video data to be updated to the memory at a first transmission speed and update the auxiliary video data; a data processing unit having a second transmission speed which is slower than the first transmission speed, as a speed of data transmission to the memory, to read out the auxiliary video data stored in the memory and output it as overlapped with predetermined video data; a switching unit to connect either of the data updating unit or the data processing unit to the memory; and a control unit to control the switching unit so that the data updating unit is connected to the memory, when the data updating unit updates the auxiliary video data. Accordingly, the loading speed of the auxiliary video data can be enhanced.

14 Claims, 4 Drawing Sheets

VIDEO PROCESSING APPARATUS AND DATA PROCESSING METHOD

CROSS-REFERENCE TO RELATED APPLICATIONS

This application claims priority from Korean Patent Application No. 2005-0047913, filed on Jun. 3, 2005, in the Korean Intellectual Property Office, the disclosure of which is incorporated herein by reference.

BACKGROUND OF THE INVENTION

1. Field of Invention

Apparatuses and methods consistent with the present invention relate to video processing and data processing, and more particularly, to video processing and data processing, whereby a loading speed of auxiliary video data is enhanced and the stability of an initial operation after power is supplied is improved.

2. Description of the Related Art

A video processing apparatus such as a television (TV) receives broadcasting signals of digital TV broadcasting and cable TV broadcasting from a broadcasting station, performs video processing of the received signals, and outputs video and sound.

FIG. 1 is a block diagram illustrating a schematic construction of a conventional video processing apparatus. The conventional video processing apparatus may comprise a central processing unit (CPU) 1 to conduct overall control of the apparatus and a scaler 3 to perform video processing of received video signals. In addition, the video processing apparatus may further comprise a first memory 5 to store therein data such as a main program of the video processing apparatus which is executed by the CPU 1, and a second memory 7 to store therein auxiliary video data such as an on-screen display (OSD) program. The first memory 5 and the second memory 7, which may be embodied as flash memories, are connected to and accessed by the CPU 1 and the scaler 3, respectively. The scaler 3 reads out auxiliary video data from the second memory 7 and processes the auxiliary video data along with received video data, to thereby output the auxiliary video data and the video data to be overlapped on a display unit (not shown) such as a display panel.

Data of the main program and data of the OSD program respectively stored in the first memory 5 and the second memory 7 are pre-loaded in the first memory 5 and the second memory 7 by a loading device (not shown) when the video processing apparatus is manufactured, and the first memory 5 and the second memory 7 in which the main program and the OSD program data are stored are installed on a circuit board (not shown). When the main program and the OSD program data need to be updated, data in the first memory 5 is loaded through the CPU 1 and auxiliary video data in the second memory 7 is loaded through the scaler 3.

However, since the scaler 3 is a circuit device whose main function is image processing, the speed that the scaler 3 transmits data to the second memory 7 is very slow, as compared with the CPU 1. For this reason, it takes much time to load the data in the second memory 7 through the scaler 3. Especially, considering the capacity of recent OSD programs is large, this causes a problem that excessive time is consumed in loading data in the second memory 7 through the scaler 3.

The conventional video processing apparatus of FIG. 1 may further comprise a power supply unit 9. The power supply unit 9 supplies a first power to the first memory 5 and the second memory 7 whereby power is constantly supplied, and a second power to the scaler 3 whereby power is not supplied at the standby state in power management. In this case, when the video processing apparatus is activated to regularly operate from the standby state, the second power is supplied to the scaler 3 and the CPU 1 initializes the scaler 3.

However, according to an inherent property of the scaler, in some cases, some time may be needed until the scaler 3 regularly operates after power supply. In case of the scaler 3 having this property, since the scaler 3 is directly connected to the second memory 7, data is transmitted to the scaler 3 from the second memory 7 even though the scaler 3 is not ready to regularly operate, thereby causing the video processing apparatus to malfunction.

SUMMARY OF THE INVENTION

The present invention provides a video processing apparatus and a data processing method, capable of enhancing a loading speed of auxiliary video data.

The present invention also provides a video processing apparatus and a data processing method, capable of enhancing a stability of an initial operation after power is supplied.

According to an aspect of the present invention, there is provided a video processing apparatus, comprising: a memory to store auxiliary video data therein; a data updating unit to transmit the auxiliary video data to be updated to the memory at a first transmission speed and update the auxiliary video data; a data processing unit having a second transmission speed which is slower than the first transmission speed, as a speed of data transmission to the memory, to read out the auxiliary video data stored in the memory and output it as overlapped with predetermined video data; a switching unit to connect either of the data updating unit or the data processing unit to the memory; and a control unit to control the switching unit so that the data updating unit is connected to the memory, when the data updating unit updates the auxiliary video data.

According to an aspect of the present invention, the control unit controls the switching unit so that the data processing unit is not connected to the memory while power is not supplied to the data processing unit, and after a predetermined time has passed after power is supplied to the data processing unit, the data processing unit is connected to the memory.

According to an aspect of the present invention, a video processing apparatus, comprising: a memory to store auxiliary video data therein; a data processing unit to read out the auxiliary video data stored in the memory and output it as overlapped with predetermined video data; a switching unit to connect or disconnect the data processing unit and the memory; and a control unit to control the switching unit so that the data processing unit is not connected to the memory while power is not supplied to the data processing unit, and after a predetermined time has passed after power is supplied to the data processing unit, the data processing unit is connected to the memory.

According to an aspect of the present invention, there is provided a data processing method of a video processing apparatus comprising a memory to store therein auxiliary video data, a data updating unit having a first transmission speed as a data transmission speed to the memory, and a data processing unit having a second data transmission speed slower than the first data transmission speed as a speed of data transmission to the memory, comprising: connecting the data updating unit and the memory; transmitting the auxiliary video data to be updated to the memory from the data updating unit and storing it in the memory; connecting the data processing unit and the memory; and reading out, by the data processing unit, the auxiliary video data from the memory and outputting it as overlapped with predetermined video data.

According to an aspect of the present invention, the data processing method further comprises supplying power to the data processing unit; determining whether a predetermined time has passed after power is supplied to the data processing unit; and connecting the data processing unit and the memory when it is determined that the predetermined time has passed.

According to an aspect of the present invention, there is provided a data processing method of a video processing apparatus having a memory to store auxiliary video data therein, and a data processing unit, comprising: supplying power to the data processing unit; determining whether a predetermined time has passed after power is supplied to the data processing unit; connecting the data processing unit and the memory when it is determined that the predetermined time has passed; and reading out, by the data processing unit, the auxiliary video data from the memory and outputting it as overlapped with predetermined video data.

BRIEF DESCRIPTION OF THE DRAWINGS

The above and/or other aspects of the prevent invention will become apparent and more readily appreciated from the following description of the exemplary embodiments, taken in conjunction with the accompany drawings, in which.

DETAILED DESCRIPTION OF EXEMPLARY EMBODIMENTS

Figure 1:
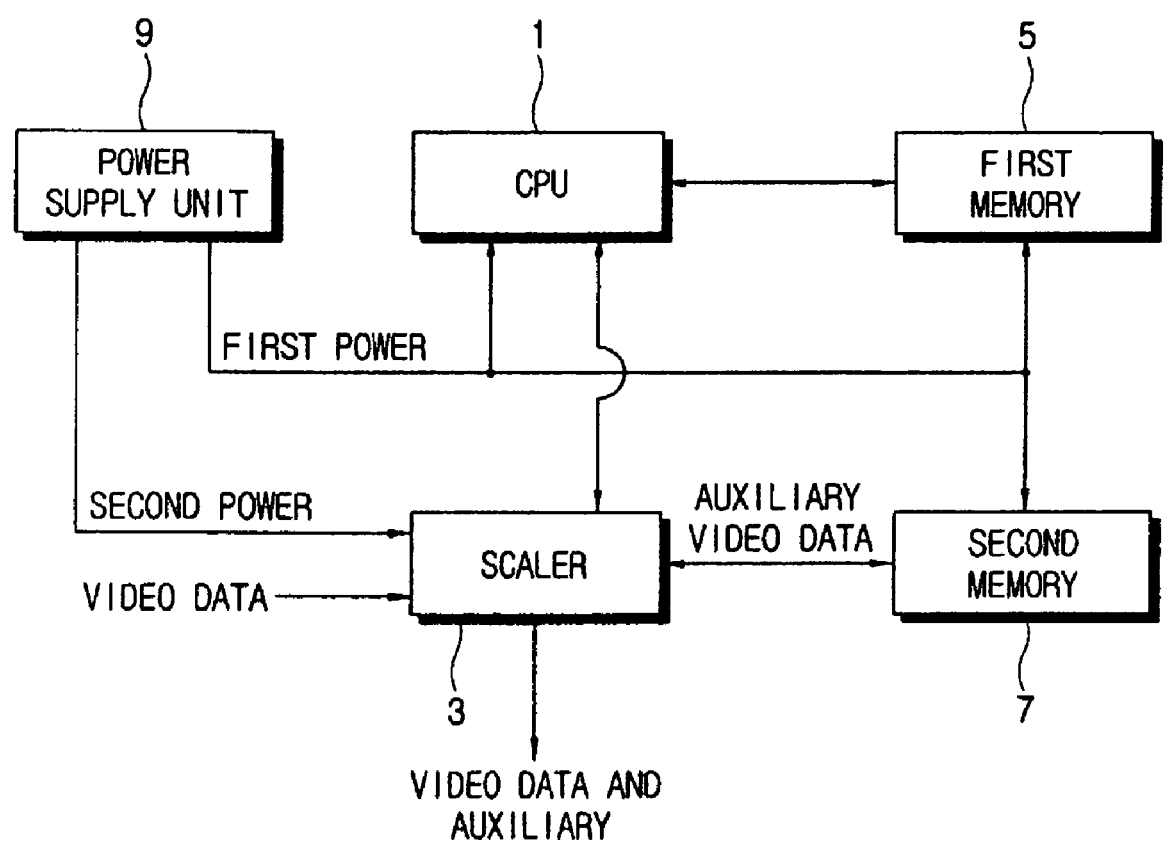
FIG. 1 is a block diagram illustrating a schematic construction of a conventional video processing apparatus.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
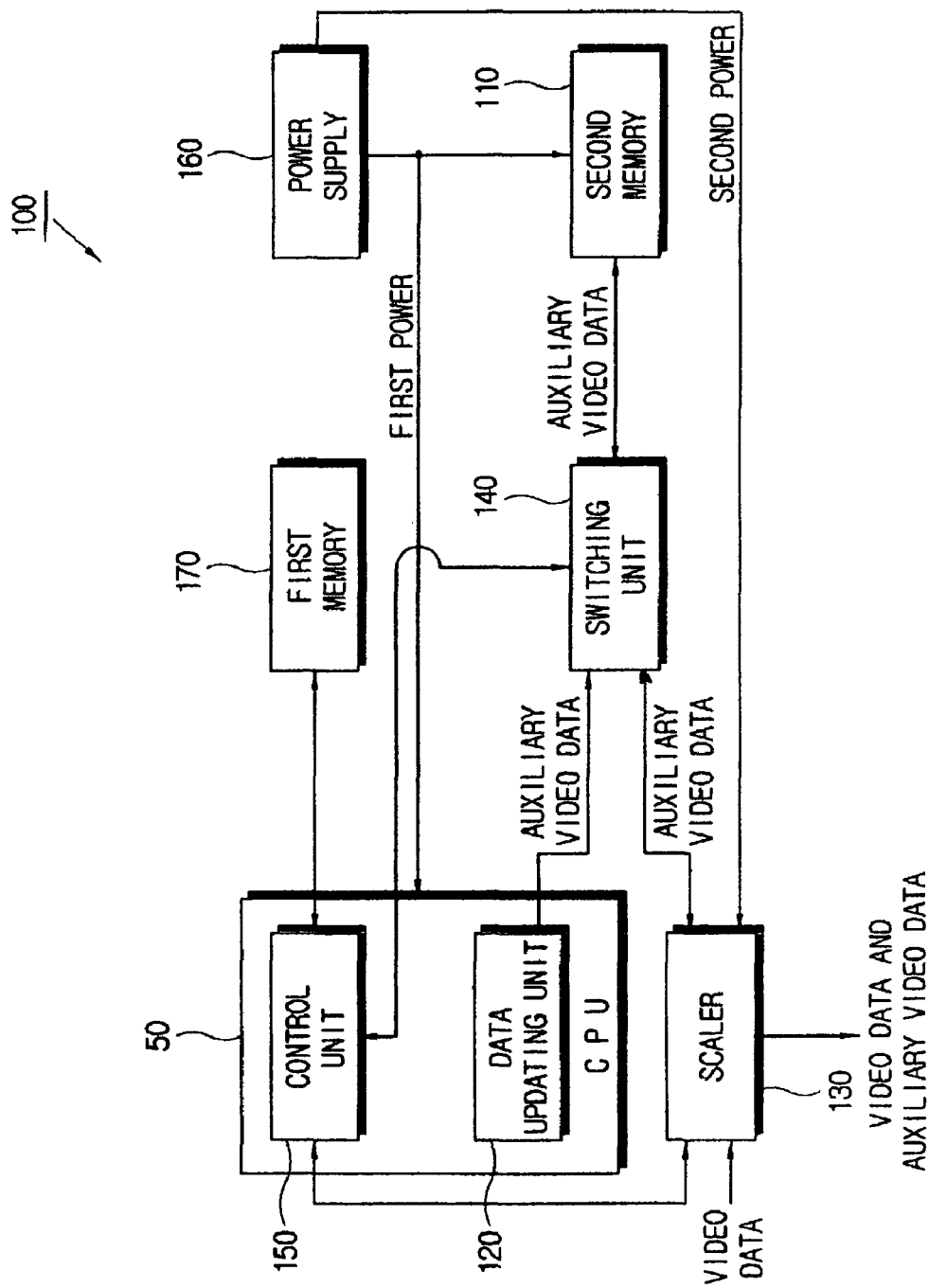
FIG. 2 is a block diagram illustrating a schematic construction of a video processing apparatus according to an exemplary embodiment of the present invention.

FIG. 2 is a block diagram illustrating a schematic construction of a video processing apparatus 100 according to an exemplary embodiment of the present invention. The video processing apparatus 100 of the present invention may be implemented as a plasma display panel (PDP) TV which receives video signals of analog TV broadcasting, digital TV broadcasting, and cable TV broadcasting and so on, performs video processing of the received video signals, and displays them as videos. However, the video processing apparatus 100 of the present invention may be implemented as other types of televisions or display devices and is not limited to implementation as a PDP TV.

As illustrated in FIG. 2, the video processing apparatus 100 of the present exemplary embodiment comprises a first memory 170, a second memory 110, a CPU 50, a scaler 130 and a switching unit 140. The CPU 50 may comprise a data updating unit 120 and a control unit 150. The first memory 170 may store therein source codes corresponding to operations of the data updating unit 120 and the control unit 150, as a computer program which can be executed by the CPU 50. The second memory 110 stores therein auxiliary video data such as an OSD program. The first memory 170 and the second memory 110 according to this exemplary embodiment may be implemented as flash memories. The auxiliary video data may be stored in advance in the second memory 110, by use of a loading device when the video processing apparatus 100 is manufactured.

When the auxiliary video data stored in the second memory 110 needs to be updated or renewed, the data updating unit 120 of this exemplary embodiment transmits auxiliary video data to be updated to the second memory 110 to thereby be stored in the second memory 110. When the data is updated in the second memory 110, the data updating unit 120 may transmit the data at a first transmission speed. The data updating unit 120 may update the data in the second memory 110 after having externally received the auxiliary video data to be updated.

The scaler 130 may perform predetermined video processing on video data received by the video processing apparatus 100 and output the processed video data to be displayed. The scaler 130 reads out the auxiliary video data stored in the second memory 110, and performs video processing thereof so that the auxiliary video data is displayed so as to overlap the received undo data on a display unit such as a display panel (not shown). As a characteristic of data write, the scaler 130 transmits the data to the second memory 110 at a second transmission speed which is slower than the first transmission speed.

The switching unit 140 is interposed between the data updating unit 120 and the scaler 130, and the memories, to connect either of the data updating unit 120 or the scaler 130 to the second memory 110, thereby enabling mutual data communication. The switching unit 140 receives a control signal from the control unit 150 so as to perform a switching operation based on the received control signal. The switching unit 140 may be embodied as logical circuits such as a multiplexer and a demultiplexer.

The control unit 150 transmits a control signal to the switching unit 140 so that the data updating unit 120 and the scaler 130 are properly connected to the second memory 110. The control unit 150 determines whether data updating of the second memory 110 is necessary. If it is determined that the data updating is necessary, the control unit 150 transmits a control signal to the switching unit 140 so that the data updating unit 120 is connected to the second memory 110, thereby performing the data updating. When the switching unit 140 is implemented with the same logical circuits as the multiplexer and demultiplexer, the control unit 150 may transmit a control signal corresponding thereto to the data updating unit 120 as a select signal.

With this configuration, the auxiliary video data updated is loaded in the second memory 110 not through the scaler 130 having a slower speed of transmission to the second memory 110, but by using the data updating unit 120 whose data transmission speed is faster than the scaler 130 through switching by the switching unit 140, thereby being capable of reducing the loading speed of the auxiliary video data.

The video processing apparatus 100 of this exemplary embodiment may further comprise a power supply unit 160. The power supply unit 160 may supply a first power to the second memory 110 and the CPU 50, and a second power to the scaler 130. In power management, the first power is supplied even at a standby state, which is a power saving mode, and the second power is not supplied at the standby state.

The control unit 150 of this exemplary embodiment controls the switching unit 140 so that the scaler 130 is not connected to the second memory 110 when the video processing apparatus 100 is at the standby state. When the video processing apparatus 100 enters into a regular operation state from the standby state, e.g., a user turns on the power thereof by use of a remote control, the control unit 150 determines whether a predetermined time has passed after the second power is supplied to the scaler 130, and transmits to the switching unit 140 a control signal so as to connect the scaler 130 to the second memory 110 after the predetermined time has passed. When the second power is supplied to the scaler 130, the control unit 150 of this exemplary embodiment may transmit a control signal to the switching unit 140 so that the scaler 130 is connected to the second memory 110 once about 100 ms has passed after resetting the scaler 130.

With this configuration, when a user turns on power of the video processing apparatus 100 at the standby state, the scaler 130 does not directly operate. The scaler 130 is connected to the second memory 110 when it is stabilized as the predetermined time has passed after power is supplied to the scaler 130. Thus, the stability at an initial operation after power supply can be enhanced.

Figure 3:
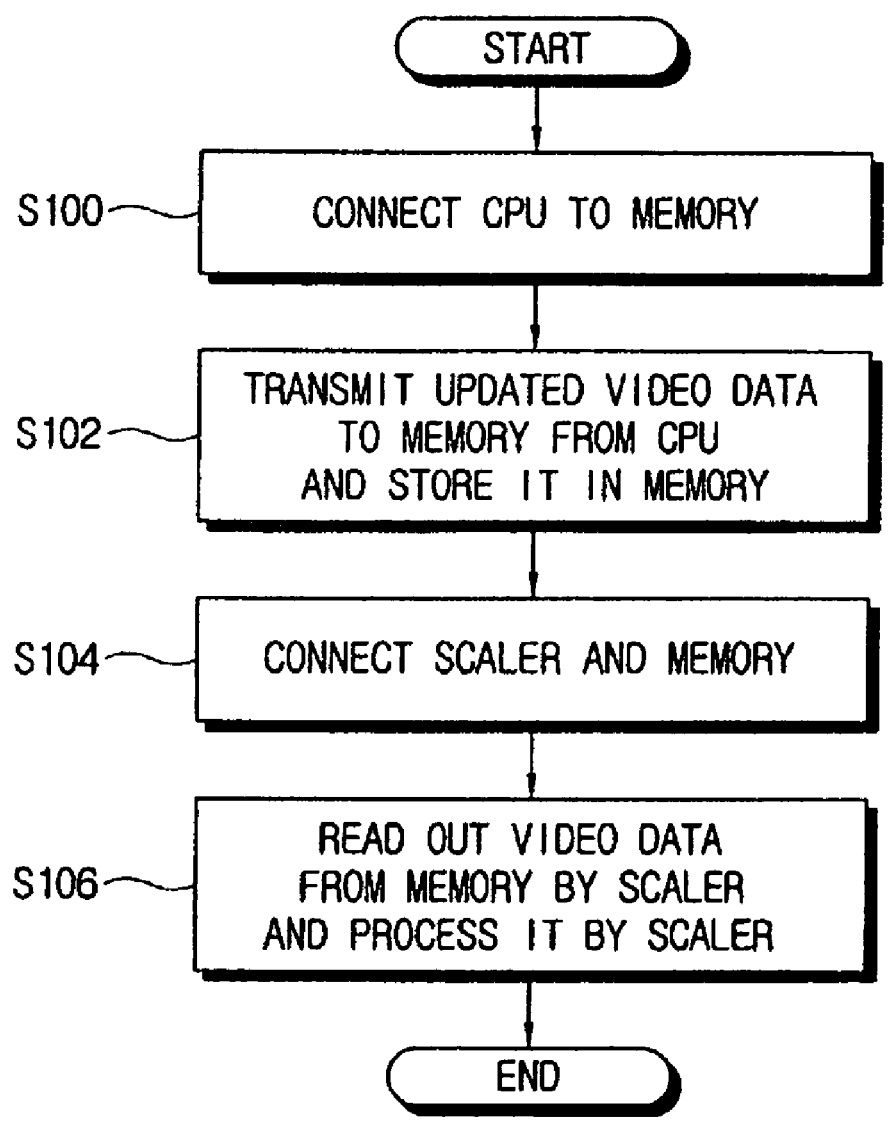
FIG. 3 is a flow chart schematically illustrating an operation of a video processing apparatus according to an exemplary embodiment of the present invention.

FIG. 3 is a flow chart to schematically illustrate an operation of the video processing apparatus according to an exemplary embodiment. When it is determined that updating of the auxiliary video data stored in the second memory 110 is necessary, the control unit 150 of the video processing apparatus 100 connects the CPU 50 to the second memory 110 at operation S100. The data updating unit 120 transmits the auxiliary video data to be updated to the second memory 110 from the CPU 50 and stores it in the second memory 110, thereby allowing the auxiliary video data to be updated at operation S102.

When it is determined that updating of the auxiliary video data has been completed, the control unit 150 connects the scaler 130 to the second memory 110 at operation S104. The scaler 130 reads out the updated auxiliary video data from the second memory 110, performs appropriate video processing of the read auxiliary video data and outputs it to be overlapped with the input video data at operation S106.

Figure 4:
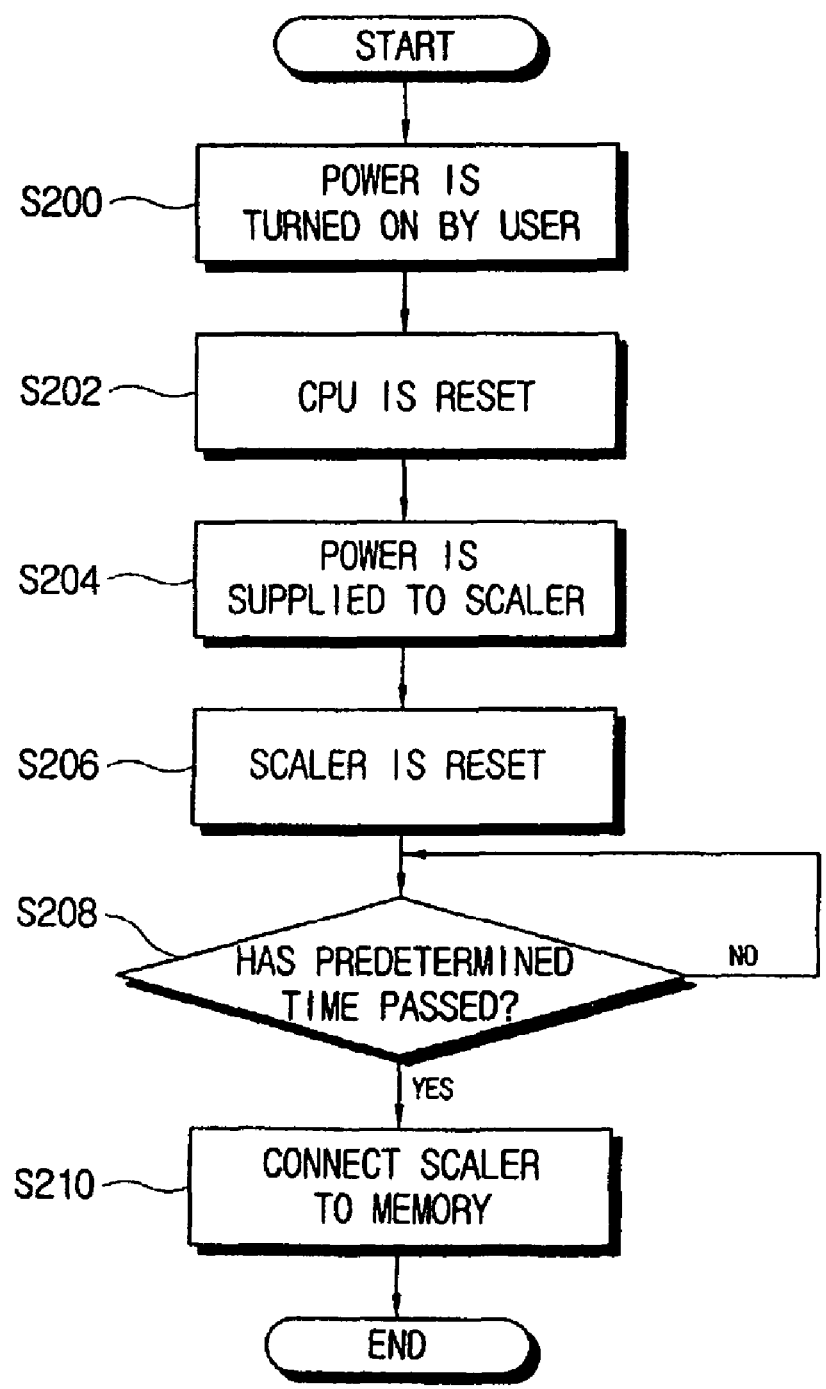
FIG. 4 is a flow chart schematically illustrating another operation of a video processing apparatus according to an exemplary embodiment of the present invention.

FIG. 4 is a flow chart to schematically illustrate another operation of the video processing apparatus 100 according to an exemplary embodiment. The control unit 150 of the video processing apparatus 100 resets the CPU 50 to initialize it at operation S202 when a user turns on power thereof by means of a remote control at operation S202. The video processing apparatus 100 supplies power to the scaler 130 through the power supply unit 160 at operation S204. The video processing apparatus 100 resets the scaler 130 so as to initialize it at operation S206.

After power is supplied to the scaler 130, the control unit 150 starts counting time and determines whether a predetermined time has passed at operation S208. When it is determined that the predetermined time has not passed ("No" of S208), the control unit 150 continues to count the time at operation S208. When it is determined that the predetermined time has passed ("Yes" of S208), the control unit 150 transmits to the switching unit 140 a control signal to thereby connect the scaler 130 to the second memory 110 at operation S210, whereby the scaler 130 is allowed to read out the auxiliary video data from the second memory 110 and conducts video processing thereof.

As described above, according to the present invention there are provided a video processing apparatus and a data processing method whereby the loading speed of the auxiliary video data is enhanced.

According to the present invention, there are further provided a video processing apparatus and a data processing method whereby stability in an initial operation after power supply is enhanced.

Those of ordinary skill in the art can understand that various replacements, modifications and changes in form and details may be made therein without departing from the spirit and scope of the present invention as defined by the following claims. Therefore, it is to be appreciated that the above described exemplary embodiment is for purposes of illustration only and not to be construed as a limitation of the invention.

What is claimed is:

1. A video processing apparatus comprising:
a memory in which auxiliary video is stored;
a data updating unit which transmits auxiliary video data to be updated to the memory and updates the auxiliary video data stored in the memory;
a data processing unit which reads the auxiliary video data stored in the memory and outputs the auxiliary video data to be displayed along with video data;
a switching unit which connects one of the data updating unit and the data processing unit to the memory; and
a control unit which controls the switching unit so that only the data updating unit, among the data updating unit and the data processing unit, is connected to the memory when the data updating unit updates the auxiliary video data.

2. The video processing apparatus of claim 1, wherein the data updating unit transmits the auxiliary video data to be updated to the memory at a first transmission speed, and the data processing unit data to the memory at a second transmission speed which is slower than the first transmission speed.

3. The video processing apparatus according to claim 2, wherein the control unit controls the switching unit so that the data processing unit is connected to the memory when a predetermined amount of time has passed after power is supplied to the data processing unit.

4. The video processing apparatus according to claim 1, further comprising a power supply which supplies a first power to the data updating unit and a second power to the data processing unit, wherein the power supply does not supply the second power to the data processing unit when the video processing apparatus is in a standby state,
wherein the control unit controls the switching unit so that the data processing unit is not connected to the memory when the video processing apparatus is in the standby state.

5. The video processing apparatus according to claim 4, wherein when the video processing apparatus enters into a regular operation state from the standby state, the control unit controls the switching unit so that the data processing unit is connected to the memory when a predetermined amount of time has passed after the second power is supplied to the data processing unit.

6. A video processing apparatus comprising:
a memory in which auxiliary video is stored;
a data updating unit which transmits auxiliary video data to be updated to the memory and updates the auxiliary video data stored in the memory;
a data processing unit which reads the auxiliary video data stored in the memory and outputs the auxiliary video data to be displayed along with video data;
a switching unit which connects one of the data updating unit and the data processing unit to the memory; and a control unit which controls the switching unit so that the data updating unit is connected to the memory when the data updating unit updates the auxiliary video data, wherein the control unit controls the switching unit so that the data processing unit is not connected to the memory when power is not supplied to the data processing unit.

7. The video processing apparatus of claim 6, wherein the data updating unit transmits the auxiliary video data to be updated to the memory at a first transmission speed, and the data processing unit data to the memory at a second transmission speed which is slower than the first transmission speed.

8. The video processing apparatus according to claim 6, wherein the control unit controls the switching unit so that the data processing unit is connected to the memory when a predetermined amount of time has passed after power is supplied to the data processing unit.

9. A video processing apparatus comprising:
  a memory in which auxiliary video data is stored;
  a data processing unit which reads the auxiliary video data stored in the memory and outputs the auxiliary video data to be display along with video data;
  a switching unit which selectively connects the data processing unit to the memory; and
  a control unit which controls the switching unit so that the data processing unit is not connected to the memory when power is not supplied to the data processing unit, and the data processing unit is connected to the memory after a predetermined amount of time has passed after the power is supplied to the data processing unit.

10. The video processing apparatus of claim 9, further comprising a power supply which supplies the power to the data processing unit, wherein the power supply does not supply the power to the data processing unit when the video processing apparatus is in a standby state,
  wherein the control unit controls the switching unit so that the data processing unit is not connected to the memory when the video processing apparatus is in the standby state.

11. The video processing apparatus according to claim 10, wherein when the video processing apparatus enters into a regular operation state from the standby state, the control unit controls the switching unit so that the data processing unit is connected to the memory when the predetermined amount of time has passed after the power is supplied to the data processing unit.

12. A data processing method of a video processing apparatus comprising a memory, a data updating unit, and a data processing unit, the method comprising:
  connecting the data updating unit to the memory;
  transmitting auxiliary video data to be updated to the memory from the data updating unit and storing the auxiliary video data in the memory;
  connecting the data processing unit to the memory; and
  reading, by the data processing unit, the auxiliary video data from the memory and outputting the auxiliary data to be displayed along with video data,
  wherein the data updating unit transmits data to the memory at a first transmission speed, and the data processing unit transmits data to the memory at a second data transmission speed which slower than the first data transmission speed.

13. The data processing method according to claim 12, further comprising:
  supplying power to the data processing unit;
  determining whether a predetermined amount of time has passed after power is supplied to the data processing unit; and
  connecting the data processing unit to the memory when it is determined that the predetermined amount of time has passed.

14. A data processing method of a video processing apparatus comprising a memory and a data processing unit, the method comprising:
  disconnecting the data processing unit from the memory when power is not supplied to the data processing unit;
  supplying power to the data processing unit;
  determining whether a predetermined amount of time has passed after power is supplied to the data processing unit;
  connecting the data processing unit to the memory when it is determined that the predetermined amount of time has passed; and
  reading, by the data processing unit, auxiliary video data from the memory and outputting the auxiliary video data to be displayed with video data.

* * * * *